United States Patent [19]
Wilson

[11] Patent Number: 6,066,341
[45] Date of Patent: May 23, 2000

[54] COMPOSITION FOR THE TREATMENT OF SCOURS IN CALVES

[75] Inventor: Colleen G. Wilson, Scottsdale, Ariz.

[73] Assignee: Farnam Companies, Inc., Phoenix, Ariz.

[21] Appl. No.: 09/270,187

[22] Filed: Mar. 15, 1999

[51] Int. Cl.$^7$ .................. A61K 31/195; A61K 33/00; A61K 35/78; A23K 1/175
[52] U.S. Cl. ................ 424/680; 424/195.1; 424/600; 424/663; 424/665; 424/670; 424/671; 424/676; 424/677; 424/679; 424/681; 424/682; 424/683; 424/692; 424/717; 514/23; 514/53; 514/54; 514/547; 514/561; 514/867; 426/2; 426/74; 426/807
[58] Field of Search ................... 424/680, 195.1, 424/600, 663, 665, 670, 671, 676, 677, 679, 681, 682, 683, 692, 717; 514/23, 53, 54, 547, 561, 867; 426/2, 74, 807

[56] References Cited

U.S. PATENT DOCUMENTS

| | | | |
|---|---|---|---|
| 3,898,328 | 8/1975 | Beigler et al. | 424/601 |
| 4,164,568 | 8/1979 | Bywater | 424/601 |
| 5,008,248 | 4/1991 | Bywater et al. | 514/23 |
| 5,038,396 | 8/1991 | Gjerlov | 424/195.1 |
| 5,149,541 | 9/1992 | Leis, Jr. et al. | 424/489 |
| 5,234,916 | 8/1993 | Hord | 514/57 |
| 5,571,542 | 11/1996 | Miller et al. | 426/2 |

FOREIGN PATENT DOCUMENTS 9837768  9/1998  WIPO.

*Primary Examiner*—John Pak
*Attorney, Agent, or Firm*—Joseph H. Roediger

[57] ABSTRACT

A composition for use in the rehydration and treatment of scours in calves. The composition includes fiber, electrolytes and three energy sources. The energy sources are sugar, medium chain triglycerides and glycine, present in a combined amount of about 14 percent by weight.

6 Claims, No Drawings

COMPOSITION FOR THE TREATMENT OF SCOURS IN CALVES

BACKGROUND

This invention relates to a composition for treating the condition of scours in calves and, in particular, a composition containing a novel combination of three sources of energy to provide accelerated rehydration of afflicted calves.

When weaned, young calves are stressed by the change in diet and other conditions as well as by transportation to another location. At this time in their young life, a significant percentage of calves develop diarrhea, a condition generally referred to as scours, which leads to dehydration. The result of dehydration is at best significant weight loss and, at worst, death. The loss of young stock to this cause is a substantial burden to the livestock industry.

Since the condition tends to be progressive, any method or composition used to arrest the condition and rehydrate an animal should be capable of acting promptly in the intestinal tract. While the administration of antibiotics has been used, the results have not been satisfactory in reducing the mortality rate and decreasing weight loss in surviving animals. The search for alternative treatment compositions has led to the use of mixtures of glucose and glycine along with electrolytes such as set forth in U.S. Pat. No. 3,898,328. Among the advantages attributed to the mixture of glucose, glycine and electrolytes is the ability to store the dry mixture for reasonable periods before adding to water for administration.

The next improvement in the treatment of scours came about through the addition of a fibrous component such as psyllium which acts as a water binding swelling agent in the intestines and reportedly carries with it a lactose decomposing enzyme. The fibrous component is combined with a like amount of electrolytes and glucose as disclosed in U.S. Pat. No. 5,038,396. The response time of the treatment is stated to be much improved over the prior art methods of treating scours.

Alternatively, treatment compositions utilizing large percentages of sugar such as glucose or galactose have been proposed for use, see U.S. Pat. Nos. 4,164,568 and 5,008,248. The glucose constituent is the dominant portion of the composition, typically 75 percent, to which is added an amino acid, such as glycine, a citrate salt and electrolytes. These compositions are reportedly useful due to the ease of formulation, palatability and stability.

SUMMARY OF THE INVENTION

The present invention is directed to a novel composition of constituents useful in the rapid treatment and early recovery of scours in calves. The early recovery of a calf to the point where it resumes taking normal feed reduces the mortality rate of afflicted calves.

The composition contains psyllium as the fibrous component, a mixture of electrolytes and a combination of three energy sources in an amount of about 14 percent by weight of the composition. The three energy sources include a sugar at about 10 percent, a medium chain triglyceride at about 3 percent and glycine at about 1 percent. The fibrous component represents two-thirds of the overall composition. The composition is shelf stable and is normally added to water or a water-milk carrier for administration to the young animal from either a bottle or a bucket.

The composition has been found to increase the young animals ability to resume normal feeding within twenty-four hours of the start of treatment. Consequently, the mortality rate has been found to decrease following ingestion of this composition, presumably due to the early reversal of the dehydration process inherent with the scours. Furthermore, the early positive results obtained through use of the novel composition reduces the weight loss experienced by the young animals caused by dehydration and permits rehydration to commence.

DESCRIPTION OF THE PREFERRED EMBODIMENT

The rehydrant composition of the present invention is comprised in a dry state of five constituents. These constituents are a vegetable fiber such as psyllium, a number of electrolytes, sugar, medium chain triglycerides and glycine. The composition is a dry mixture to be administered when added to a carrier at 12 hour intervals.

The vegetable fiber constituent is recognized to expand in volume when resident in a calf intestine to firm up or gel the contents of the intestine. The condition of scours is characterized by a liquidation of the contents which promote a dehydrating process that causes severe and rapid weight loss leading to death. The vegetable fiber which is typically psyllium plays a significant role in restoring consistency to its normal state. The psyllium is the major constituent of the composition and is present at about 67 percent by weight thereof.

The second constituent is comprised of electrolytes in an amount of about 19 percent by weight of the composition. The electrolytes are needed to replenish those lost during the dehydrating process of scours. The electrolyte can be a mixture of salts containing sodium, potassium, calcium, magnesium, chloride and other ions. The most significant salt is sodium chloride in the present composition which is present at about 5 percent by weight of the composition.

The three additional constituents, termed energy sources, are sugar, glycine and medium chain triglycerides (MCT) added in the combined amount of about 14 weight percent. The sugar present at about 10 percent in the form of sucrose. Medium chain triglycerides provide an easily digested source of fat and are added at about 3 percent by weight. The glycine is an amino acid which aids in the absorption of the other constituents and is present in the amount of about 1 percent by weight. While sugar and glycine have been used in a number of scour treating compositions is relatively large quantities, the particular combination of the sucrose, MCT and a minor amount of glycine have been found to promote a fast-acting scour treatment with the result that weight loss stops rapidly and the overall mortality rate in an affected group of calves is reduced.

The composition is fed to calves after being mixed with a liquid carrier. The liquid is water for the first three feedings and the fourth feeding, if needed, uses a mixture of equal parts water and milk. The strength of the mixture of the dry composition and carrier is 2.5 oz. per 2 quarts of water. The mixture is administered orally to the calf every 12 hours for 4 feedings. If the calf responds favorably after one or two feedings, the regular diet and feeding schedule can be resumed.

The present composition was administered on the above-noted 12 hour cycle to 309 calves exhibiting the scours. At the end of the second feeding of the composition, i.e. 12 hours into the treatment, 44 percent of the calves were deemed ready to resume normal feeding. After the third feeding, i.e. 24 hours into the treatment, 81 percent of the calves were found ready to resume a normal feed schedule and diet. Thus, the composition was fast-acting in enabling these calves to resume their normal feeding habits and rehydrate to a healthy condition.

In two mortality studies comparing the performance of the present composition with that of two different commercially-available calve scour treatments, the test results showed reduced mortality for the subject composition. In mortality study #1, a large number of calves at high risk for scours did not receive colostrum from their dams and were the subject of the study. This study considered the effects of treatment on 175 calves suffering from scours. In one group, 85 calves suffering from scours were treated with the present composition and 18 died for a mortality rate of 21.2%. At the same time, a second group of 90 calves were treated with product A and 26 died for a mortality rate of 28.9%.

The second mortality study #2 involved a collection of calves suffering from scours that was about double the size evaluated in study #1. The present composition was administered to 176 calves and 6 died for a mortality rate of 3.4%. Another product B used for the treatment of scours was administered to 187 calves having scours and 14 died for a mortality rate of 7.5%. These two studies performed on two distinct collections of calves having the scours with an approximate division of each collection in half demonstrates the improvement in mortality rate when treatment is conducted using the present novel composition. The products A and B used in the mortality tests did not contain the three energy sources found in the subject composition.

The composition of a product presently being marketed by the Farnam Companies, Inc. of Phoenix, Ariz. utilizing the subject invention is as follows:

Psyllium 65.0 to 70.0

Sugar 10.0

Granulated Salt 4.0–5.0

Sodium Citrate 4.0–5.0

Sodium Bicarb 4.0–5.0

MCT Powder 3.0

Muriate/Potash 2.0–3.0

Glycine 1.00

Silicon Dioxide 1.00

Magnesiun Hydroxide 1.00

The silicon dioxide serves as an anti-caking agent for the composition. The medium chain triglycerides are characterized by six to twelve carbon atoms in the molecule in contrast to short and long chain triglycerides. Suitable medium chain triglyerides are commercially available. All ingredients are mechanically mixed to form the dry stable composition. Administration takes place after addition of the composition to a liquid carrier.

While the above description has referred to a specific embodiment of the invention, it is to be noted that modifications and variations may be made thereto without departing from the scope of the invention as claimed.

What is claimed:

1. A rehydrant composition for use in the treatment of scours in animals, said composition comprising:

a) psyllium at about 65 to 70 percent;

b) electrolytes at about 16 to 21 percent;

c) sugar at about 10 percent;

d) medium chain triglycerides at about 3 percent; and e) glycine at about 1 percent, all of said percents being by weight of the composition.

2. The composition of claim 1 wherein said sugar is sucrose.

3. The composition of claim 2 wherein said electrolytes include sodium, potassium, magnesium and chloride ions.

4. The composition of claim 3 further comprising a liquid carrier for said composition.

5. The composition of claim 4 wherein said liquid carrier is a mixture of milk and water in about equal parts.

6. The composition of claim 4 wherein said composition is added in the amount of 2.5 oz to 2 quarts of liquid.

* * * * *